United States Patent
Huang et al.

(10) Patent No.: US 10,769,396 B2
(45) Date of Patent: Sep. 8, 2020

(54) DEVICE FOR IDENTIFYING ALUMINUM ALLOY DIE-CAST HUB

(71) Applicant: CITIC Dicastal CO., LTD., Qinhuangdao, Hebei (CN)

(72) Inventors: Liang Huang, Qinhuangdao (CN); Jianyu Zhang, Qinhuangdao (CN); Honglei Liu, Qinhuangdao (CN); Bao Zhang, Qinhuangdao (CN); Jinqi Lv, Qinhuangdao (CN); Yingfeng Wang, Qinhuangdao (CN); Lei Jiang, Qinhuangdao (CN); Qingbo Kong, Qinhuangdao (CN); Chunbo Li, Qinhuangdao (CN); Ziguang Liu, Qinhuangdao (CN); Qinghui Xu, Qinhuangdao (CN); Qian Yang, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 16/217,316

(22) Filed: Dec. 12, 2018

(65) Prior Publication Data
US 2019/0294842 A1 Sep. 26, 2019

(30) Foreign Application Priority Data
Mar. 23, 2018 (CN) .......................... 2018 1 0244948

(51) Int. Cl.
G06K 19/06 (2006.01)
G06K 7/10 (2006.01)
B60B 27/00 (2006.01)

(52) U.S. Cl.
CPC ...... G06K 7/10831 (2013.01); B60B 27/0047 (2013.01); G06K 19/06131 (2013.01)

(58) Field of Classification Search
CPC ..... G06K 7/10851; G06K 7/14; G06K 7/1486
USPC ............ 245/462.16, 462.01, 462.06, 462.43
See application file for complete search history.

(56) References Cited

U.S. PATENT DOCUMENTS

| | | | | |
|---|---|---|---|---|
| 5,011,650 A | * | 4/1991 | Fero ....................... | G21C 17/00 374/159 |
| 2004/0148775 A1 | * | 8/2004 | Kobayakawa ............ | F16N 3/12 29/888.01 |
| 2004/0240205 A1 | * | 12/2004 | Hayakawa ........... | G02B 7/1821 362/257 |

* cited by examiner

*Primary Examiner* — Daniel St Cyr
(74) *Attorney, Agent, or Firm* — Cooper Legal Group, LLC

(57) ABSTRACT

A device for identifying an aluminum alloy die-cast hub includes a laser scanning means, a controller and a computer, in which the laser scanning means includes an image sensor and is configured to shoot an image from the surface of the aluminum alloy die-cast hub; the controller and the computer are in data connection with the image sensor, and the model information of the hub is read from bar code information.

2 Claims, 6 Drawing Sheets

| Industrial code encoding table |||||||||||
|---|---|---|---|---|---|---|---|---|---|---|
| Feature | A1 | A2 | A3 | A4 | A5 | B1 | B2 | B3 | B4 | B5 |
| 1 | 11 | 1 | 1 | 1 | 11 | 00 | 0 | 0 | 0 | 00 |
| 2 | 1 | 11 | 1 | 1 | 11 | 0 | 00 | 0 | 0 | 00 |
| 3 | 11 | 11 | 1 | 1 | 1 | 00 | 00 | 0 | 0 | 0 |
| 4 | 1 | 1 | 11 | 1 | 11 | 0 | 0 | 00 | 0 | 00 |
| 5 | 11 | 1 | 11 | 1 | 1 | 00 | 0 | 00 | 0 | 0 |
| 6 | 1 | 11 | 11 | 1 | 1 | 0 | 00 | 00 | 0 | 0 |
| 7 | 1 | 1 | 1 | 11 | 11 | 0 | 0 | 0 | 00 | 00 |
| 8 | 11 | 1 | 1 | 11 | 1 | 00 | 0 | 0 | 00 | 0 |
| 9 | 1 | 11 | 1 | 11 | 1 | 0 | 00 | 0 | 00 | 0 |
| 0 | 1 | 1 | 11 | 11 | 1 | 0 | 0 | 00 | 00 | 0 |
| Begin | 1010 |||||||||| 
| End | 1101 ||||||||||
| "11", "00" denote thick lines, "1", "0" denote thin lines |||||||||||

FIG. 5

DEVICE FOR IDENTIFYING ALUMINUM ALLOY DIE-CAST HUB

CROSS-REFERENCE TO RELATED APPLICATIONS

The present application claims benefit of Chinese Patent Application No. 201810244948.X, filed on Mar. 23, 2018, the contents of which are hereby incorporated by reference in its entirety.

BACKGROUND

After the implementation of a three-guarantee method on automobiles, the requirements for quality, information, management and the like in the production process of aluminum alloy hubs are increasingly stringent. A permanent mark needs to be added on the hub as a carrier for retrospective management to carry out management during production and traceability after delivery. The conventional method is: in the production process of the hub, that is, in the die casting process; after the blank is formed, a two-dimensional code is etched on the surface of the hub by using a laser engraving machine. In other processes, the code is read through a scanner and relevant information is recorded. The scanner identifies the two-dimensional code by means of image photographing. The following problems arise: the hub needs to be quenched in a pool in the heat treatment process, and the black parts of some two-dimensional codes fall off, so that the contrast is lowered, resulting in reducing the identification rate; and in the machining process, the emulsion corrodes the black part of the two-dimensional code of the hub, so that the contrast is lowered, resulting in reducing reduce the identification rate.

SUMMARY

The present disclosure relates to the technical field of automobile parts, specifically to a device and a method for identifying an aluminum alloy die-cast hub.

Accordingly, an object of the present disclosure is to provide a device and a method for efficiently reading a bar code on the surface of an aluminum alloy hub. The bar code is machined by an industrial bar code method in the inner cavity of a die. After the hub is die-cast, an industrial bar code is formed at the rim of the hub. The bar code is read using a laser height difference method in other processes. The influence of contrast reduction on the identification rate is thus overcome. The bar code information can still be read efficiently even when the light is dark or very bright.

In an aspect of the present disclosure, there is provided a device for identifying an aluminum alloy die-cast hub, including a laser scanning means, a controller and a computer, the laser scanning means includes an image sensor and is configured to shoot an image from the surface of the aluminum alloy die-cast hub; the controller and the computer are in data connection with the image sensor, and the model information of the hub is read from bar code information.

In a preferred aspect of the present disclosure, the laser scanning means is configured to read a change in height, width or color of a bar code on the surface of the hub.

In a preferred aspect of the present disclosure, the laser scanning means includes a laser head with a first objective lens and an image sensor with a second objective lens.

In a preferred aspect of the present disclosure, the first objective lens and the second objective lens are such configured that the optical path of laser emitted by the laser head of the laser scanning means passes through the first objective lens, the bar code on the surface of the hub to be detected and the second objective lens to reach the image sensor, and the first objective lens and the second objective lens are rotatable objective lenses.

In other aspect of the present disclosure, further disclosed is a method for identifying an aluminum alloy die-cast hub using the above device, which is characterized in including the steps of: 1) causing the laser head to emit laser to pass through the first objective lens, then reflecting the laser in a bar code zone of the aluminum alloy die-cast hub, and transmitting the laser to the image sensor through the second objective lens; 2) rotating the first objective lens and the second objective lens so that the laser beam sweeps over the bar code zone of the aluminum alloy die-cast hub, and acquiring a height change value of the bar code zone by the image sensor; and 3) processing the height change value into bar code information by the controller, reading the bar code information content, and transmitting the bar code information content to the computer.

In a preferred aspect of the present disclosure, a bar code is etched by a laser engraving machine at the bar code zone of the aluminum alloy die-cast hub.

In a preferred aspect of the present disclosure, the bar code zone of the aluminum alloy die-cast hub is located on the outer side of the rim of the aluminum alloy die-cast hub or at a spoke flange weight reduction socket.

In other aspect of the present disclosure, further provided is the following technical solution: Disclosed are a device and a method for identifying an aluminum alloy die-cast hub. The device is mainly composed of objective lenses, a laser head, an image sensor, a controller, a computer and the like. The method is characterized in including the steps of: a, machining a bar code in the inner cavity of a die; b, forming an industrial bar code on the surface of a wheel after casting molding; c, identifying the industrial bar code through a height difference; and d, reading the code using laser. In this device, the bar code is machined in the inner cavity of the wheel die by means of a milling machine, laser and the like. After casting molding, the industrial bar code is formed on the surface of the wheel: rim, flange, spoke and the like. The industrial bar code is identified through the height difference. The laser reading method is fast, accurate and low in cost. The bar code information content includes wheel model, die number, etc., which facilitates quick reading and identification of an identification system.

The present disclosure has the beneficial effect of effectively overcoming the surface defects such as round corners, roughness and brightness by adopting the laser reading method. The height difference is converted into a bar code and the information content is read, thereby ensuring the contrast of the bar code, and effectively improving the identification rate.

BRIEF DESCRIPTION OF DRAWINGS

The embodiments of the present disclosure will be described in detail below in combination with the accompanying drawings, in which:

FIG. 5 is an industrial bar code encoding table used in embodiments 1-3 of the present disclosure.

Figure 1:
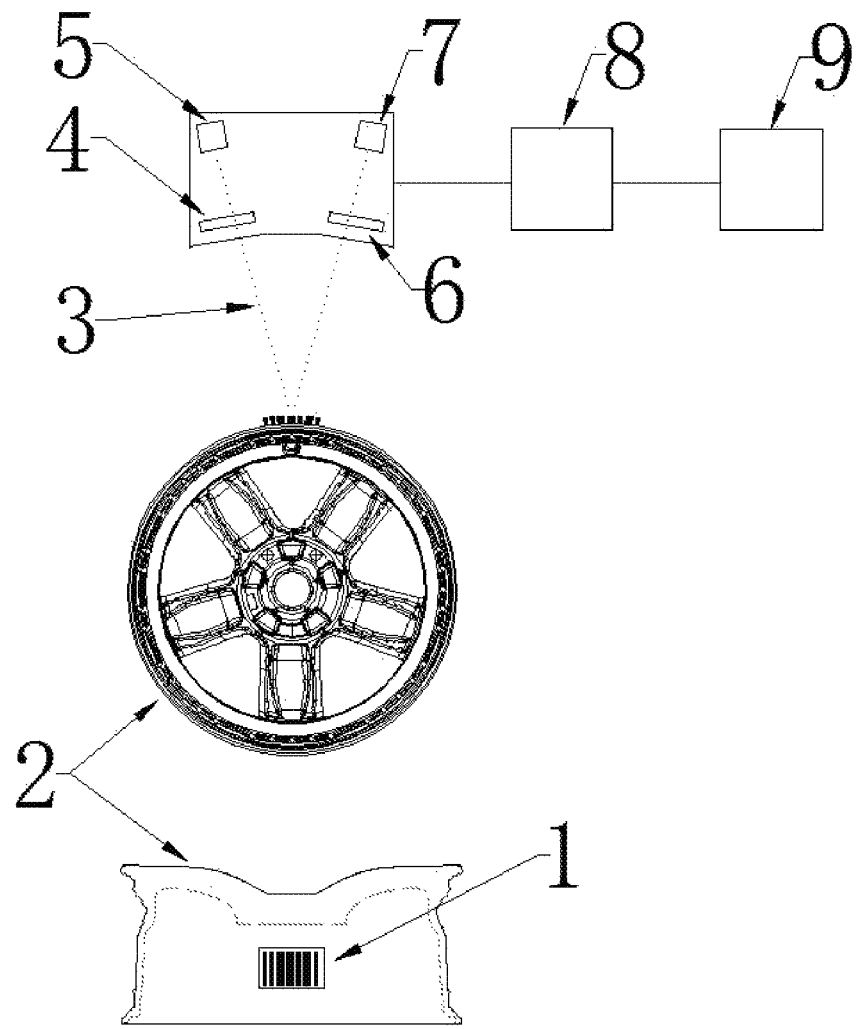
FIG. 1 is a principle schematic diagram of a laser reading means according to the present disclosure.

LIST OF REFERENCE SYMBOLS 1 bar code
2 hub outer rim
3 laser scanning trajectory
4 first objective lens
5 laser head
6 second objective lens
7 image sensor
8 controller
9 computer
10 laser engraving machine
11 roller bed
12 die-cast bar code hub
13 motor
14 rotating arm
15 laser reading means
17 roller bed
18 code reading device
19 first X-ray device
20 second X-ray device
21 die-cast bar code hub
22 cylinder
23 sorting plate
24 stopper
25 die-cast bar code hub
26 roller bed
27 code reading device
28 machining lathe

DETAILED DESCRIPTION

In FIG. 1, a bar code 1 is die-cast on a hub outer rim 2.

A laser head 5 emits laser, the laser passes through a first objective lens 4 and is transmitted to the hub surface bar code 1, and the laser refracted by the bar code 1 is transmitted to an image sensor 7 by a second objective lens 6. The first objective lens 4 and the second objective lens 6 are rotated at matching angles, and the laser is sequentially transmitted from left to right through a laser scanning trajectory 3 to the image sensor 7. The image sensor 7 records a height change value and transmits the height change value to a controller 8. The controller 8 converts the height change value into a bar code through an algorithm and reads the bar code information content. The controller 8 transmits the bar code information content to a computer 9.

Embodiment 1: Application of Die-Casting Workshop

Figure 2:
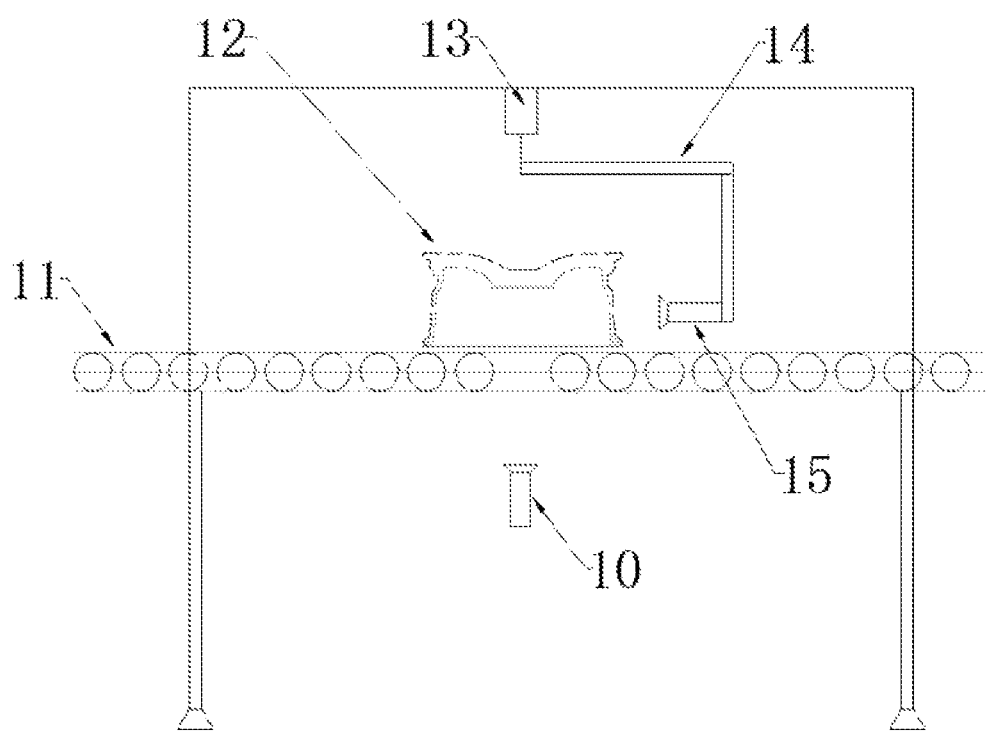
FIG. 2 is an application schematic diagram of a die-casting workshop according to the present disclosure.

In FIG. 2, a roller bed 11 is rotated to transmit a die-cast bar code hub 12 to a position right above a laser engraving machine 10. A motor 13 drives a rotating arm 14 to rotate, and a laser reading means 15 reads the bar code information and transmits same to the computer. The computer identifies the wheel model, adds the wheel model production serial number information, and transmits the wheel model production serial number information to the laser engraving machine 10. The laser engraving machine 10 converts the information content into a two-dimensional code and etches the two-dimensional code to a hub flange weight reduction socket.

Note: The die-cast hub rim is to be machined later, so the two-dimensional code position conversion is required.

It can be realized: production quantity statistics, production time record, unique management and traceability of hubs; record of the production information of each hub about the process, device, personnel and the like; informatization of the die-casting workshop; zero delay transmission of information; quick aggregation of data, and automatic formation of a report formed for easy analysis.

Embodiment 2: Application of X-Ray Inspection Process

Figure 3:
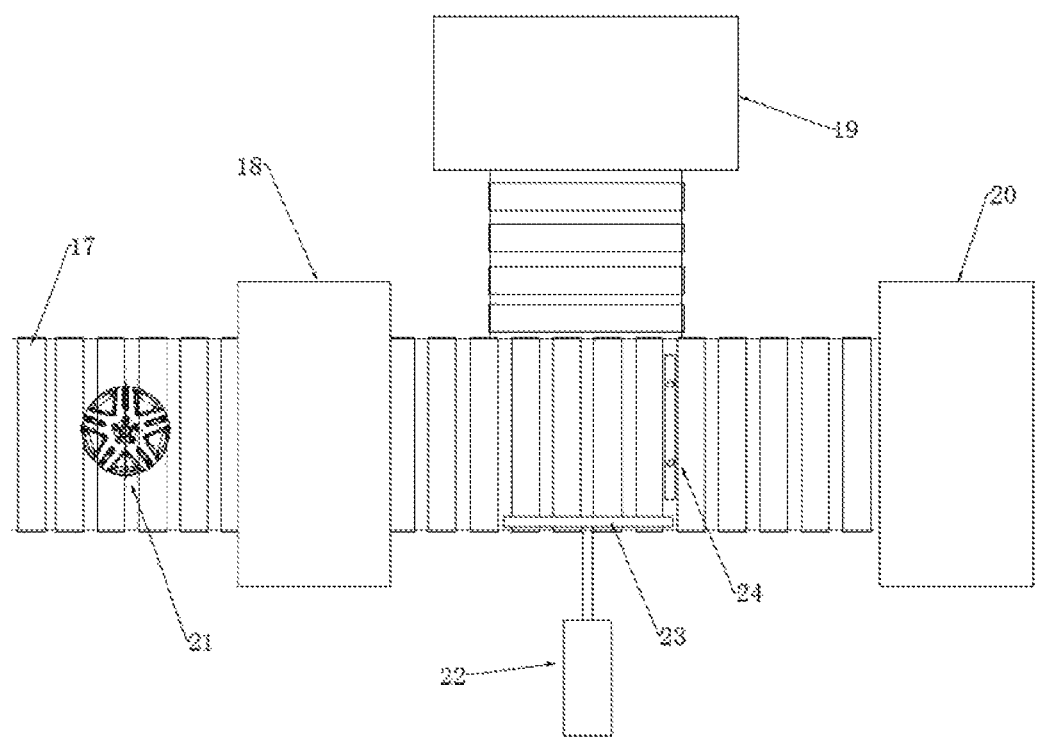
FIG. 3 is an application schematic diagram of an X-ray inspection process according to the present disclosure.

In FIG. 3, the roller bed 17 is rotated to transmit a die-cast bar code hub 21 to move from left to right. The bar code information is read when the die-cast bar code hub 21 passes through a code reading device 18, and a hub model and a corresponding inspection device are determined. When the die-cast bar code hub 21 is determined to be the inspected device corresponding to second X-ray device 20, a sorting plate 23 is retracted, a stopper 24 is lowered, and the hub is transmitted to the second X-ray device 20. When the die-cast bar code hub 21 is determined to be the inspected device corresponding to first X-ray device 19, the stopper 24 is raised, a cylinder 22 pushes the sorting plate 23, and the sorting plate 23 pushes the hub, so that the hub is transmitted to the first X-ray device 19.

It can realize: automatic screening of hubs, which overcomes the defects of misjudgment and the like when hubs are identified by front photographing in the past; inspection quantity statistics, inspection time record, unique management and traceability of the hubs; the X-ray device being programmed according to the product die classification, which reduces the problems of misjudgment, crash and the like caused by the die difference; zero delay transmission of information; quick aggregation of data, and automatic formation of a report formed for easy analysis.

Embodiment 3: Application of Machining Workshop

Figure 4:
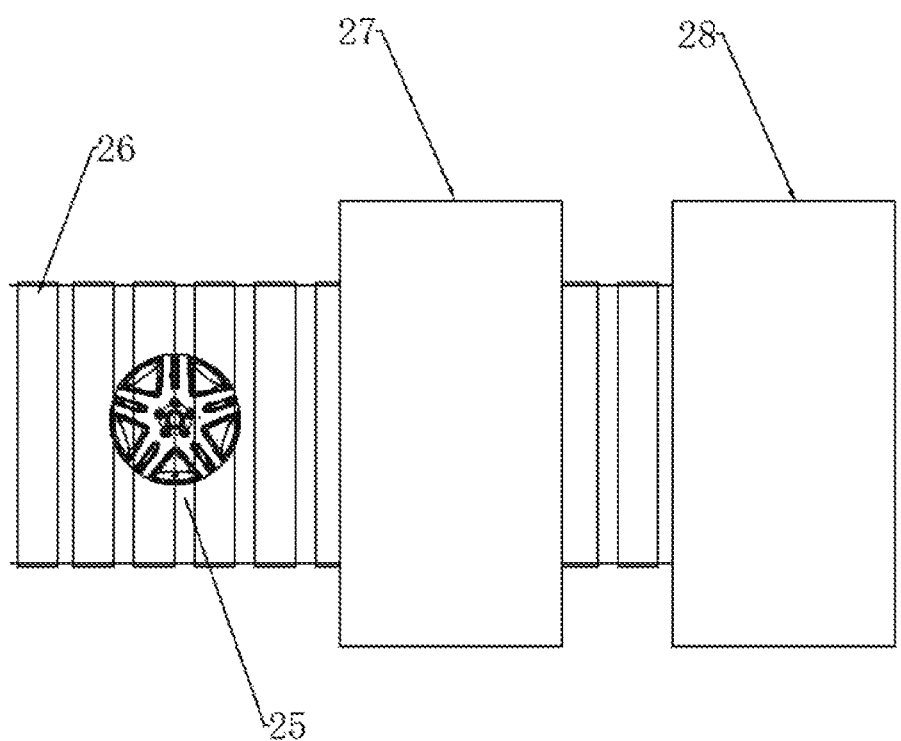
FIG. 4 is an application schematic diagram of a machining workshop according to the present disclosure.
Figure 6:
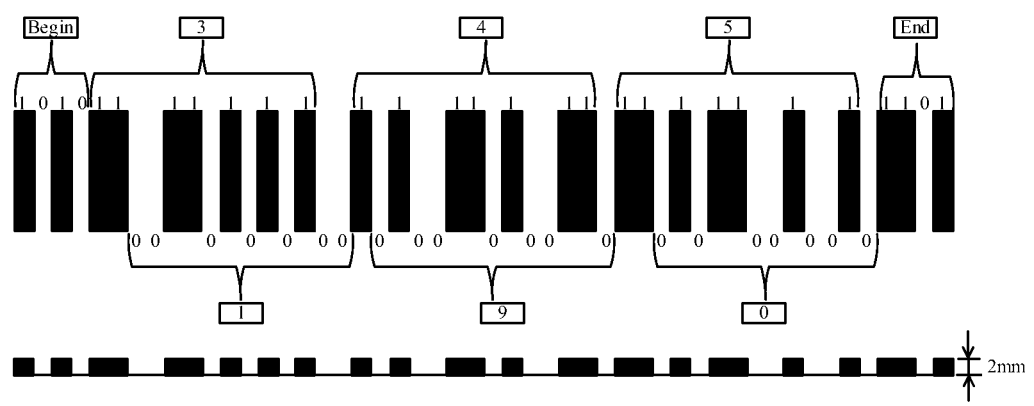
FIG. 6 is an example of a bar code in embodiments 1-3 of the present disclosure.

In FIG. 4, a roller bed 26 is rotated to transmit a die-cast bar code hub 25 to move from left to right. The bar code information is read when the die-cast bar code hub 25 passes through the code reading device 27, and a hub model and a die number are determined. A machining lathe 28 calls a program for automatic machining according to the hub model and the die number.

It can realize: automatic screening of hubs, which overcomes the defects of misjudgment and the like when hubs are identified by front photographing in the past; production quantity statistics, production time record, unique management and traceability of the hubs; record of the production information of each hub about the process, device, personnel and the like; the machining device being programmed according to the product die classification, which reduces the problems of crash, out of tolerance and the like caused by the die difference; zero delay transmission of information; quick aggregation of data, and automatic formation of a report formed for easy analysis.

The invention claimed is:

1. A device for identifying an aluminum alloy die-cast hub, comprising a laser scanning means, a controller and a computer, wherein the laser scanning means comprises a laser head with a first objective lens and an image sensor with a second objective lens and is configured to shoot an image from a surface of the aluminum alloy die-cast hub; the controller and the computer are in data connection with the image sensor, and model information of the aluminum alloy die-cast hub is read from bar code information, wherein the first objective lens and the second objective lens are configured such that an optical path of a laser emitted by the laser head of the laser scanning means passes through the first objective lens, is incident on a bar code on the surface of the aluminum alloy die-cast hub to be detected after passing through the first objective lens, and passes through the second objective lens after being incident on the bar code to reach the image sensor, and the first objective lens and the second objective lens are rotatable objective lenses.

2. The device for identifying an aluminum alloy die-cast hub according to claim 1, wherein the laser scanning means is configured to read a change in height, width or color of the bar code on the surface of the aluminum alloy die-cast hub.

\* \* \* \* \*